(12) United States Patent
Tredoux

(10) Patent No.: US 9,369,606 B2
(45) Date of Patent: Jun. 14, 2016

(54) AUTOMATED PAIRING OF MULTIFUNCTION DEVICES AND EXTERNAL DEVICES

(75) Inventor: Gavan L. Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/611,133

(22) Filed: Sep. 12, 2012

(65) Prior Publication Data

US 2014/0071471 A1   Mar. 13, 2014

(51) Int. Cl.
   *G06F 3/12*   (2006.01)
   *H04N 1/32*   (2006.01)
   *H04N 1/00*   (2006.01)

(52) U.S. Cl.
   CPC .......... *H04N 1/32502* (2013.01); *G06F 3/1204* (2013.01); *G06F 3/1232* (2013.01); *G06F 3/1291* (2013.01); *G06F 3/1292* (2013.01); *H04N 1/00236* (2013.01); *H04N 1/00307* (2013.01); *H04N 1/00408* (2013.01); *H04N 1/00474* (2013.01); *H04N 2201/0055* (2013.01); *H04N 2201/0072* (2013.01); *H04N 2201/0094* (2013.01); *H04N 2201/0098* (2013.01)

(58) Field of Classification Search
   None
   See application file for complete search history.

(56) References Cited

U.S. PATENT DOCUMENTS

| | | | |
|---|---|---|---|
| 6,032,004 A | 2/2000 | Mirabella, Jr. et al. | |
| 7,082,316 B2 | 7/2006 | Eiden et al. | |
| 7,874,664 B2 | 1/2011 | Gervasi et al. | |
| 2004/0218207 A1* | 11/2004 | Biundo et al. | 358/1.15 |
| 2007/0120955 A1* | 5/2007 | Shimosato | H04N 21/4223 348/14.01 |
| 2007/0273744 A1* | 11/2007 | Yamada et al. | 347/204 |
| 2008/0113700 A1* | 5/2008 | Czyzewski et al. | 463/11 |
| 2008/0227393 A1 | 9/2008 | Tang et al. | |
| 2008/0291263 A1 | 11/2008 | Tokoro | |
| 2009/0000969 A1* | 1/2009 | Walker et al. | 206/307 |
| 2009/0240814 A1* | 9/2009 | Brubacher et al. | 709/227 |
| 2010/0003038 A1* | 1/2010 | Jo | 399/23 |
| 2010/0194026 A1* | 8/2010 | Iguchi | 271/3.15 |
| 2011/0070825 A1 | 3/2011 | Griffin et al. | |
| 2011/0158659 A1* | 6/2011 | Tarao | 399/8 |
| 2011/0159813 A1 | 6/2011 | Mallinson et al. | |
| 2011/0216349 A1* | 9/2011 | McCorkindale et al. | 358/1.15 |
| 2012/0075656 A1* | 3/2012 | Yasukawa et al. | 358/1.14 |
| 2012/0268777 A1* | 10/2012 | Fry | G06F 3/1218 358/1.15 |

* cited by examiner

*Primary Examiner* — John Wallace
(74) *Attorney, Agent, or Firm* — Gibb & Riley, LLC

(57) ABSTRACT

A hash table method and structure comprises a processor that receives a plurality of access requests for access to a storage device. The processor performs a plurality of hash processes on the access requests to generate a first number of addresses for each access request. Such addresses are within a full address range. Hash table banks are operatively connected to the processor. The hash table banks form the storage device. Each of the hash table banks has a plurality of input ports. Specifically, each of the hash table banks has less input ports than the first number of addresses for each access request. The processor provides the addresses to the hash table banks, and each of the hash table banks stores pointers corresponding to a different limited range of addresses within the full address range (each of the different limited range of addresses is less than the full address range).

12 Claims, 5 Drawing Sheets

300 — Pairing Instructions:

One or more wireless printing devices are detected.

To wirelessly connect to one of the printing devices, open one of the paper trays. This will identify the printing device you desire to use, and this device will automatically be paired with the printing device you select merely by having you open the paper tray. This will allow you to operate the printing device through your device.

AUTOMATED PAIRING OF MULTIFUNCTION DEVICES AND EXTERNAL DEVICES

BACKGROUND

Embodiments herein generally relate to multifunction devices and more particularly to multifunction devices that can be paired with external devices by having the user take a simple physical action.

Using a networked device usually requires knowing its network address. Many mechanisms exist for discovering network addresses of devices such as printers or multifunction devices (MFDs), for example by crawling the network, or using multicasts or broadcasts. However, it may not be obvious to a non-skilled user which of many addresses discovered in this way corresponds to the device he or she is standing in front of, or wants to use. Finding out the correct network address can be difficult or inconvenient and can involve printing out configuration sheets, navigating device menus and so on, which non-skilled users find difficult and intimidating, even if they know what a network address, e.g., an IP address, looks like. This makes it hard to configure client devices, such as smartphones, with the address of printing device to print to, or scan from, or otherwise use, even if one is standing directly at the intended MFD device. This limits adoption of solutions involving, for example, mobile to MFD communication, and raises administration costs required to deploy such solutions and train people to use them.

SUMMARY

An exemplary networked-device apparatus herein includes a marking engine and a component operatively connected to (directly or indirectly connected to) a processor. The component can comprise something that can be opened or manipulated by the user, or otherwise have its state changed, such as a lid, a media tray, a document feeder, an access door, etc. Further, a wired or wireless network connection (which may be direct (peer to peer) or indirect (for example, a shared network like a LAN or WAN)) is used for communication between the external device and the MFD. The external device is external to the printing apparatus and can comprise, for example, portable computing devices including cellular phones, smart phones, personal digital assistants (PDAs), laptop computers, notebook computers, tablet devices, electronic readers, etc., or can comprise non-portable computing devices such as desktop computers, workstations, kiosks, vending machines, etc.

The external device displays a message. The message instructs the user of the external device to change a state of the component of the MFD, and the message notifies the user that doing so will pair the external device with the MFD apparatus that had its component opened, and that doing so will allow user, through the external device, to utilize features of the MFD apparatus. The external device then waits to detect the state change of the component of the MFD after it has displayed the message. The external device then establishes a communications link between the external device and the printing device, based on the user altering the state of the component, say by opening it, and this communications link pairs the external device to the MFD apparatus.

The communications link allows the external device to use any feature of the MFD apparatus including printing and scanning documents, transmitting documents over a network, etc. The external device thus displays a menu of options to utilize features of the printing apparatus after the communications link is established.

The establishment of the communications link and the pairing of the printing apparatus and the external device is performed based only upon altering the state of the component, without requiring further user input or action to pair the devices. Therefore, the user does not need to know or understand anything about pairing devices or network addressing to pair their external device to the printing apparatus, and only needs to follow the instruction to alter the state of the component of the printing apparatus in order to have the external device automatically complete the pairing action.

A method embodiment herein also pairs the MFD apparatus with the external device. The method automatically communicates with the external device using a network connection and enables the external device to display a message for a user to change a state of the component operatively connected to the processor and that doing so will allow the external device to utilize features of the printing apparatus, using the network connection.

The method detects the state change of the component after the external device has displayed the message, using the external device. Thus, the method establishes a communications link between the external device and the printing device through the network connection based on the state change of the component to pair the external device to the printing apparatus. Further, the method causes the external device to display a menu of options to utilize features of the printing apparatus after the communications link is established.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
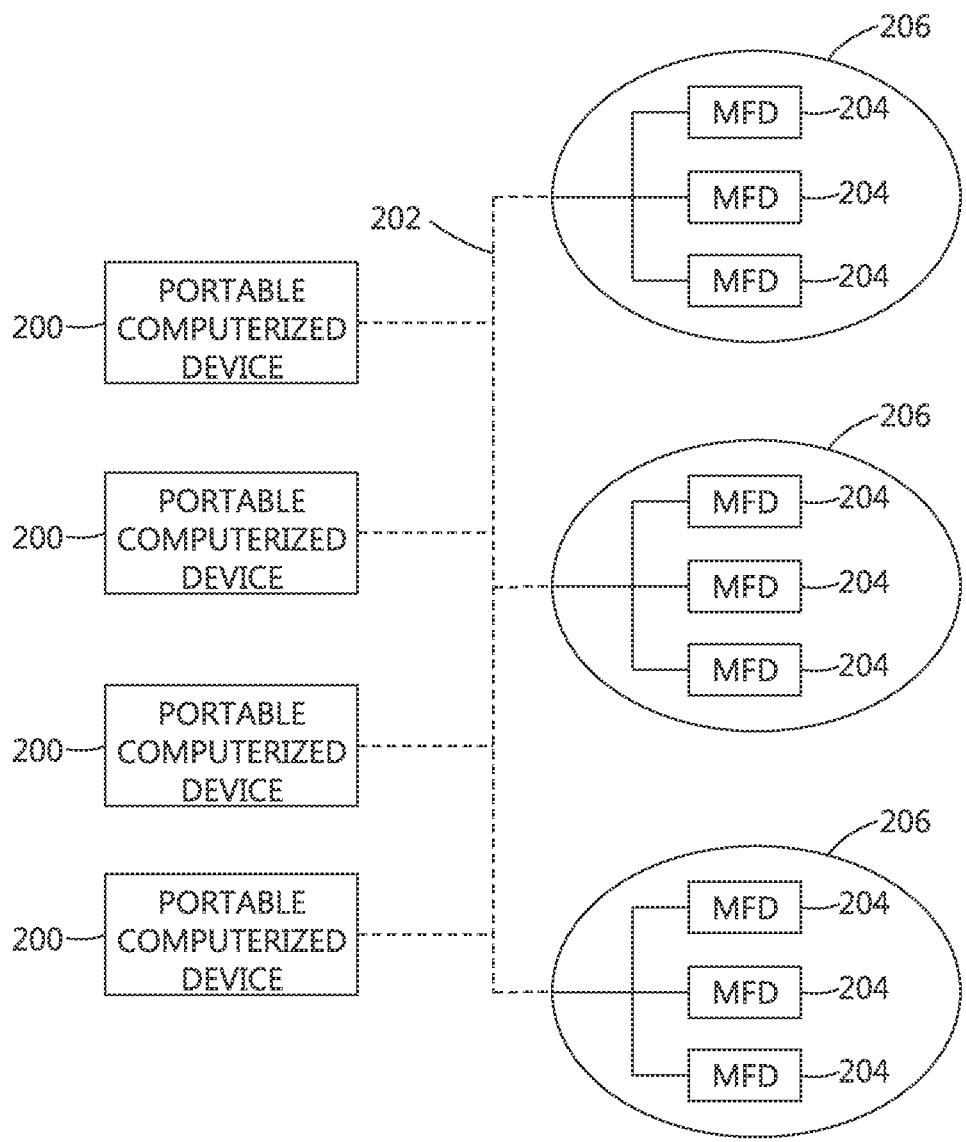
FIG. 1 is a schematic diagram of a system according to embodiments herein.

As mentioned above, it can be hard to configure client devices, such as smartphones, with the address of the printing device to print to, or scan from, or otherwise use. Therefore, the embodiments herein provide a mechanism for reliably identifying the network address of a physically proximate device by using existing features of the multifunction devices in a novel way, in concert with an application running on a mobile device, which intends to communicate with the printing device. The systems and methods herein use the act of opening an input tray on a printing device, or similar device, to physically select it from a list of possible devices.

For example, a user may want to use a device to communicate with a printing device over a network, but may not know the exact network address of the intended device, and there may be more than one device to choose from. This may happen when a user has a smartphone or tablet device, and wants to print to or scan from the printing device, using an application running on the smartphone or tablet. The user may be physically present in front of the printing device, but still may not know what the network address of the device is, or even what a network address is, precisely. It may be relatively hard to get this information from the device, say by printing a configuration sheet, or navigating its screens to find it out, or locating a system administrator who knows. Many small to medium businesses have no system administrators at all.

Many users have no networking knowledge of any kind. Even if the machine address is posted on the wall above the printing device they may not be able to recognize it as a network address, and typing it into their mobile device may be difficult or inconvenient even if they could. It is possible to use network discovery techniques to find the addresses of multifunction devices on the local network, but if there is more than one such device, it is not necessarily obvious which address corresponds to which physical machine. The user can be shown a list of addresses to choose from, but simply may not know which address to choose. Even if device model information is also given for each address, there may be more than one device of the same model, or some skill may be required to match the model identifier with the branding on the outside of the device.

As mentioned above, the systems and methods herein use the act of opening an input tray on a printing device, or similar device, to physically select it from a list of possible devices. Networked devices are discovered herein by an application running on the mobile device, using any one or more of the existing methods (e.g. SNMP broadcast, WS-Discovery multicast etc.). The correct address is selected from the list of discovered addresses by instructing the user to open a drawer on the intended printing device. The open drawer is detected, from the mobile device, over SNMP, and the address of the device with the open drawer is used as the selected printing device.

Thus, the embodiments herein solve the device selection problem. The application, or a component used by it, running on the mobile or similar device performs network discovery using any one or more of the existing or future techniques for doing this, e.g. SNMP crawling or broadcasting, UDDP, WS-Discovery multicasting or similar. Each device discovered is queried to determine its model information and the state of its input trays, again using SNMP or some such device management protocol. The user is then prompted to open a drawer or input tray on the intended printing device. The application then queries each device to find which one has had a drawer opened. This information is readily available over SNMP on most multifunction devices of interest. The application has already accounted for devices that had open drawers to start with, it can thus determine which ones have a newly opened drawer.

This gives users an easily understandable tactile way to "touch" the device the user wants to use, and requires no additional hardware, and no changes to existing controller software of the multifunction devices. The method is not limited to mobile client devices but also applies to any client device such as a laptop or desktop computer.

This method/system can also resolve ambiguity if more than one device has an open drawer. Thus, in highly unlikely cases where two or more devices happen to have drawers opened in the same time, by pure coincidence, and cannot even be distinguished by their model identifiers, the application may ask the user to open more drawers, or to close and reopen the drawer, combining or repeating this until there are no ties. This is a very unlikely scenario, but will only involve a little more shutting and opening of drawers when it does.

The methods/systems disclosed herein have considerable advantages over alternatives because they involve easily understood physical contact with the intended printing device, something which has natural resonance with users. The user requires absolutely no networking knowledge, and does not even have to understand or recognize what a network address is, literally touching the intended device instead. No hardware or controller software changes are required for the multifunction devices, which are relatively hard and expensive to change. The methods/systems disclosed herein use an application on the client device and printing apparatus, but custom applications are readily added to client devices such as smartphones or tablets.

In other variations, instead of opening a drawer, a user could be asked to add or remove some other supplies, e.g. place or remove a sheet on or from the printing device bypass tray, add or remove a sheet to/from the automatic document feeder, and so on. All these involve altering a physical characteristic of the device in a way commonly detectable using a device management protocol such as SNMP, and basing the device selection on the detected change in physical state. Further, although the discussion herein uses mobile client devices as an illustrative example, the same method applies to any client devices, including desktop computers, laptops and other devices, the mobility of which is not directly relevant.

As shown in FIG. 1, exemplary system embodiments herein include various portable computerized devices 200 which are sometimes referred to herein as external devices because such devices 200 are external to various printing apparatus 204, which may be grouped at various locations 206.

The external devices 200 can comprise, for example, portable computing devices including cellular phones, smart phones, personal digital assistants (PDAs), laptop computers, notebook computers, tablet devices, electronic readers, etc., or can comprise non-portable computing devices such as desktop computers, workstations, kiosks, vending machines, etc. The multi-function printing devices (MFDs) 204 can include print servers, printing devices, copiers, scanners, facsimile machines, modular devices, etc., and are in communication (operatively connected to one another) by way of a wired or wireless communications link 202 (represented by solid and dashed lines in the drawings).

Figure 2:
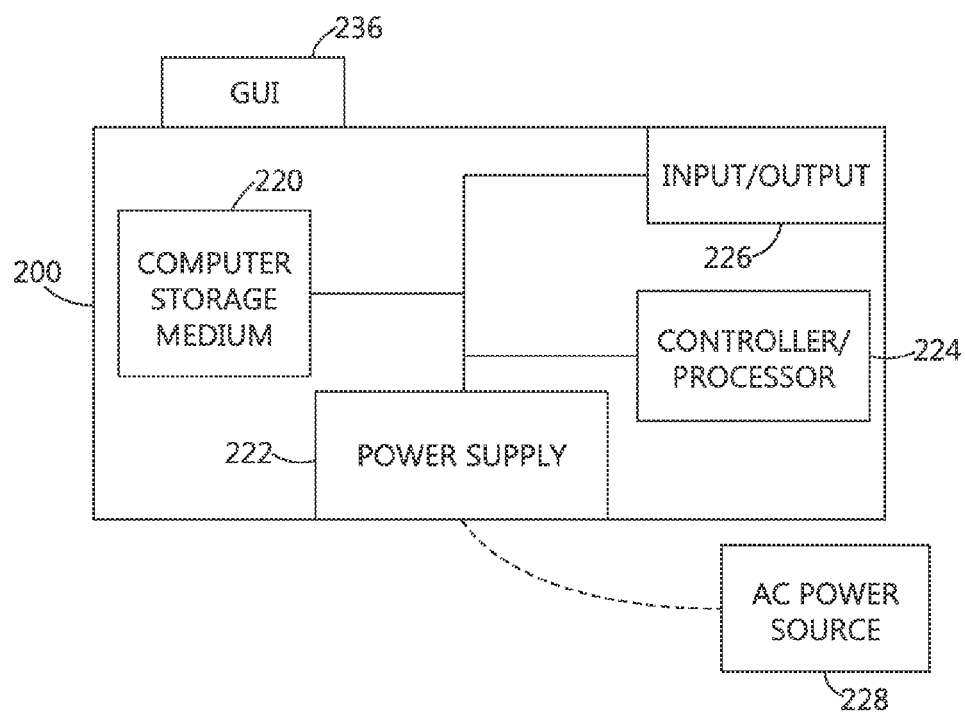
FIG. 2 is a side-view schematic diagram of a device according to embodiments herein.

FIG. 2 illustrates one of the external devices 200 (a computerized device) which can be used with embodiments herein. The computerized device 200 includes a controller/processor 224 and a communications port (input/output, that can comprise a wired or wireless network connection) 226 operatively connected to the processor 224 and to the computerized network 202 external to the computerized device 200. The processor 224 operates a commonly available application that performs network discovery using any existing or future techniques to allow the printing device to detect that the external device 200 is available for paring. This network discovery activity allows the printing device 204 to cause one or more messages to appear on the external device 200. Also, the external device 200 can include at least one accessory functional component, such as a graphic user interface assembly 236 that also operate on the power supplied from the external power source 228 (through the power supply 222).

The input/output device 226 is used for communications with the printer device 204. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Such functional components operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 3:
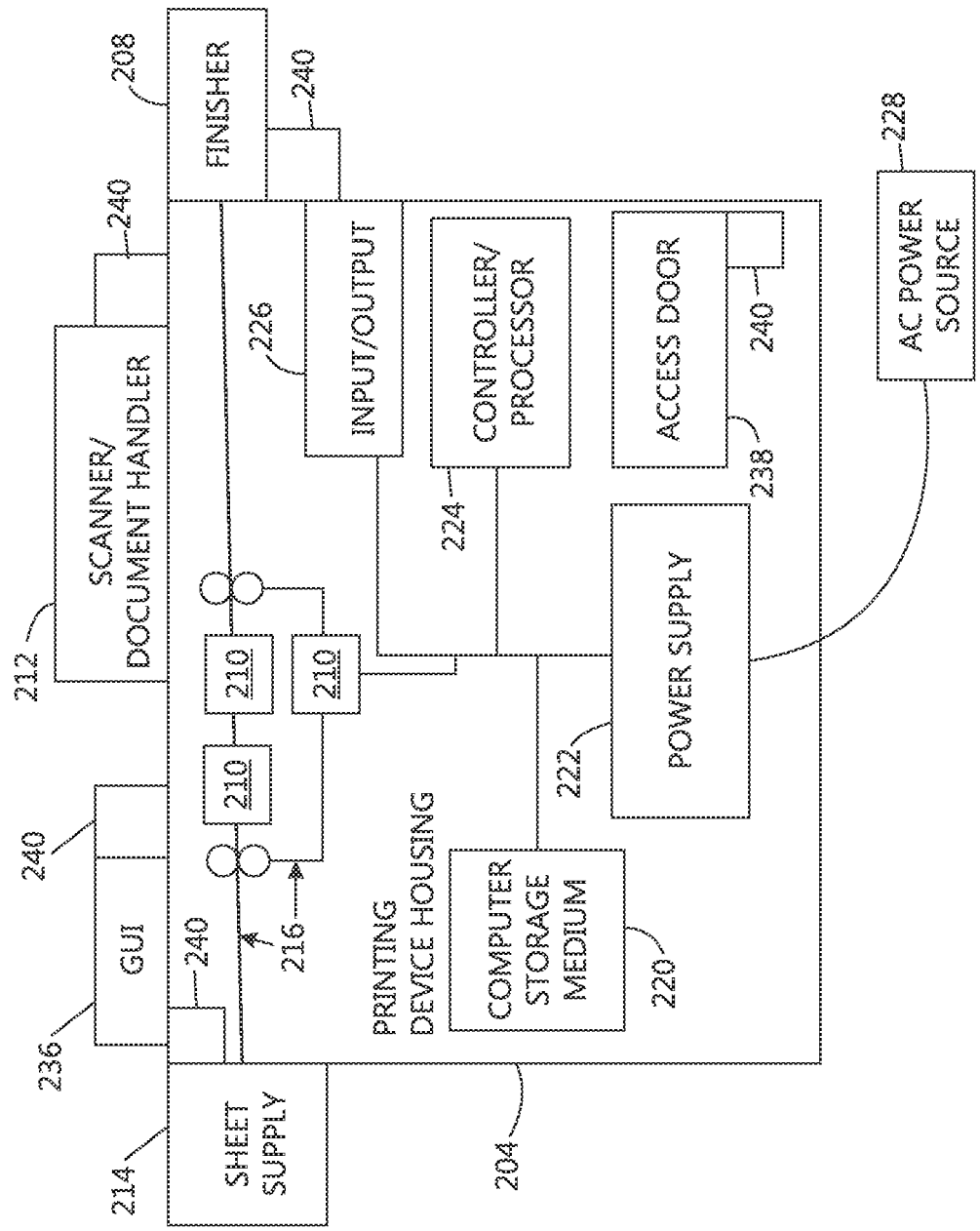
FIG. 3 is a side-view schematic diagram of a device according to embodiments herein.

FIG. 3 illustrates one of the multifunction devices 204 in greater detail, which can similarly comprise, a controller/processor 224 and a communications port (input/output) 226 operatively connected to the processor 224 and to the computerized network 202 external to the computerized device 200. Again, the input/output device 226 is used for communications to and from the multifunction devices 204 and can comprise a wireless communication transceiver and/or a wired communications port. The wired or wireless network connection 226 communicates directly or indirectly with a corresponding wired or wireless network connection 226 on the external devices 200.

The processor 224 controls the various actions of the multifunction devices 204. A non-transitory computer storage medium device 220 (which can be optical, magnetic, capacitor based, etc.) is readable by the processor 224 and stores instructions that the processor 224 executes to allow the multifunction devices 204 to perform its various functions, such as those described herein.

A power supply 222 can comprise a power storage element (e.g., a battery) and connects to an external alternating current power source 228 and converts the external power into the type of power needed by the various components. Also, the multifunction device 204 can include at least one accessory functional component, such as a graphic user interface assembly 236 that operate on the power supplied from the external power source 228 (through a power supply 222).

The printing device 204 includes at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include accessory functional components (such as a scanner/document handler 212, etc.) that also operate on the power supplied from the external power source 228 (through the power supply 222).

Thus, components such as the sheet supply 214, document handler 212, finisher 208, etc., are operatively connected to (directly or indirectly connected to) the processor 224 and include sensors 240 that can sense when the components are opened or moved by a user. The component can comprise something that can be opened or manipulated by the user, such as a lid, a media tray 214, a document feeder 212, an access door 238, etc., and include sensors 240 that can sense when the components are opened or moved by a user.

Figure 4:
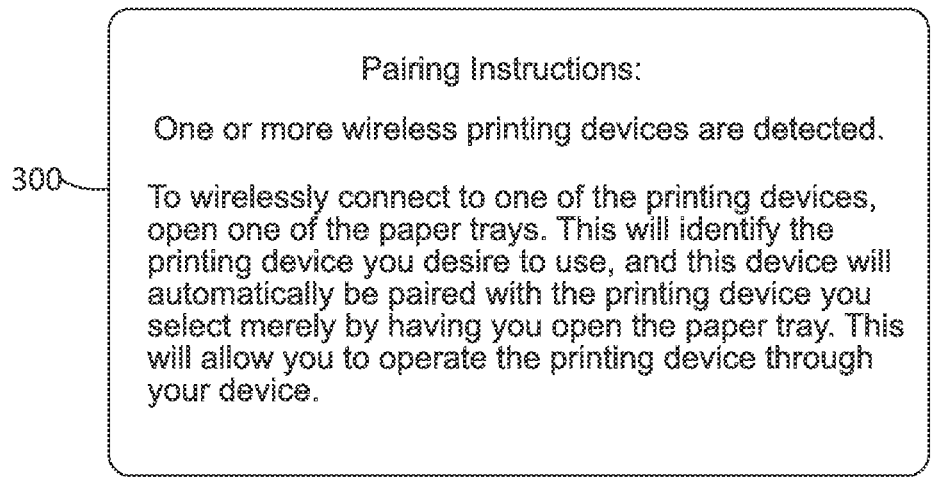
FIG. 4 is a schematic diagram of a screenshot according to embodiments herein.

The external device and the MFD are connected over a network, which may be a wireless network or a wired network, or some future mechanism, which places the two in contact with each other. The network connection may be direct (peer to peer) or indirect (for example, a shared network like a LAN or WAN). An MFD may or may not have its own wireless network connection, but may be connected to a network that does. The processor 224 of the external device 200 operates through the wired or wireless network connection 226 to cause the external device to display a message, such as the message 300 shown in the screenshot shown in FIG. 4 in coordination with the application running on the external device 200. The message 300 instructs the user of the external device to change a state of the component (in this example, one of the paper trays) and the message notifies the user that doing so will pair the external device with the printing apparatus that had its component opened, and that doing so will allow user to utilize features of the printing apparatus through the external device.

The processor 224 of the external device 200 then waits to detect the state change of the component after the external device has displayed such a message 300, potentially by detecting a standard notification of a door or drawer being opened, a sheet being inserted, a document handler being raised produced by the MFD 204. The processor 224 of the external device 200 then automatically establishes a communications link between the external device 200 and the printing device 204 through the wired or wireless network connection 226 based on the state change of the component, and this communications link pairs the external device 200 to the printing apparatus 204. The MFD may be passive in this interaction. The external (mobile) device lists addresses of MFDs and monitors faults raised by the MFDs. When the drawer/door is opened, the MFD may just raise a fault or notification (blindly). The MFD will always do this (whether the mobile is present or not) and the MFD may not be aware that paring is taking place. In some embodiments, the "external device" (mobile) performs all the active pairing work. Thus, in some embodiments, the MFD is (mostly) passive and has its SNMP state polled by the external device (or the MFD raises a trap to all listeners). To the contrary, in other embodiments, the pairing process can be performed mostly by the MFD, where the MFD causes messages to be displayed on the external device and provides pairing inputs to the external device. Thus, as would be understood by those ordinarily skilled in the art, the pairing process can be performed by only one of the devices, or can be shared between the devices depending upon specific device implementation.

Figure 5:
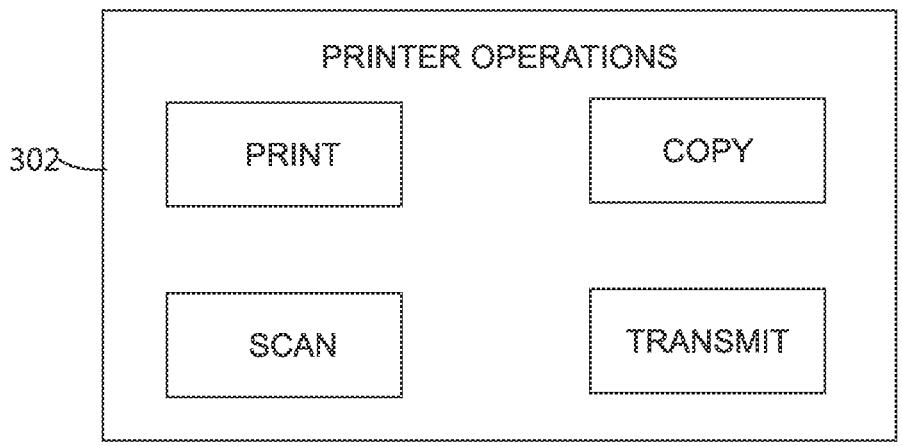
FIG. 5 is a schematic diagram of a screenshot according to embodiments herein.

The communications link allows the external device 200 to use any feature of the printing apparatus 204 to which they have permission, including printing and scanning documents, transmitting documents over a network, etc. The processor 224 thus operates through the wired or wireless network connection 226 to cause the external device 200 to display a menu of options, such as those shown in screenshot 302 in FIG. 5, to utilize features of the printing apparatus after the communications link is established.

The establishment of the communications link and the pairing of the printing apparatus 204 and the external device 200 is performed automatically by the processor 224, based only upon the state change of the component, without requiring further user input or action to pair the devices. Therefore, the user does not need to know or understand anything about pairing devices to pair their external device 200 to the printing apparatus 204, and only needs to follow the instruction to open the component of the printing apparatus 204 in order to have the printing apparatus automatically complete the pairing action.

Figure 6:
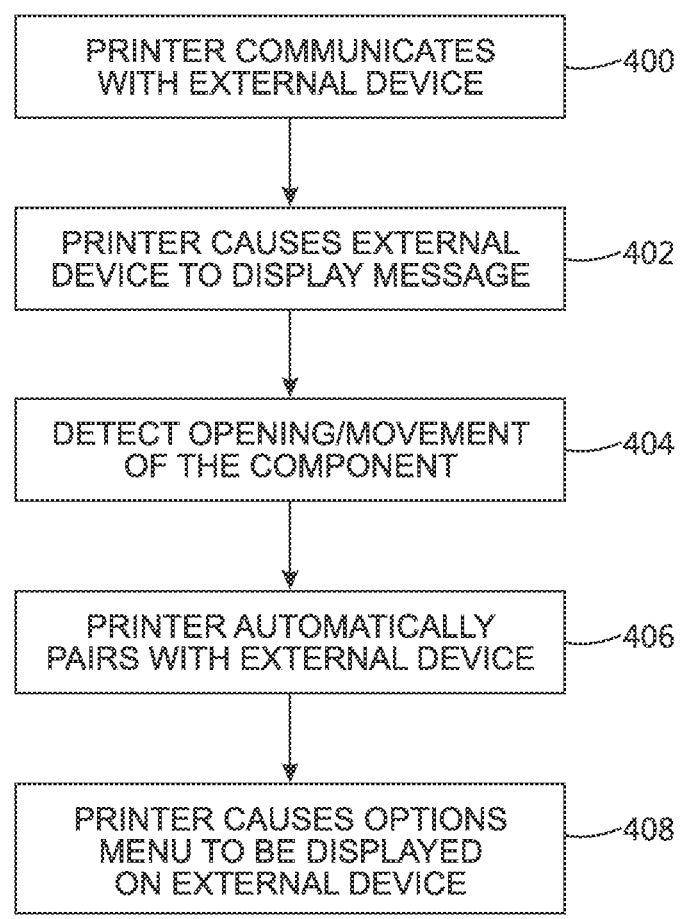
FIG. 6 is a flow diagram illustrating various embodiments herein.

FIG. 6 is flowchart illustrating an exemplary method herein that automatically pairs the printing apparatus with the external device. In item 400 of this exemplary method the external device automatically communicates with the MFD using a wired or wireless network connection. In item 402, the external device automatically causes the external device to display a message for a user to change a state of a component, and that doing so will allow the external device to utilize features of the printing apparatus.

The external device detects the state change of the component in item 404 after the external device has displayed the message in item 402, using the processor of the external device. Thus, the external device automatically establishes a communications link between the external device and the printing device through the wired or wireless network connection in item 406, based on the state change of the component 404 to pair the external device to the printing apparatus (using the processor). Further, in item 408, the external device to displays a menu of options to utilize features of the printing apparatus after the communications link is established in item 406.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
a processor;
a graphic user interface; and
a wireless network connection operatively connected to said processor,
said wireless network connection discovering a multifunction printing device when a network address of said multifunction printing device is unknown to said apparatus,
said apparatus being external to said multifunction printing device,
said graphic user interface displaying a message for a user to physically move a lid, media tray, document feeder, or access door of said multifunction printing device to wirelessly pair said apparatus to said multifunction printing device,
said processor detecting said user moving said lid, media tray, document feeder, or access door after said apparatus has displayed said message,
in response to said processor detecting said user moving said lid, media tray, document feeder, or access door, said multifunction printing device automatically identifying said network address of said multifunction printing device to said apparatus, without further user input, and
said processor wirelessly pairing said apparatus to said multifunction printing device through said wireless network connection based on said network address of said multifunction printing device, in response only to said user moving said lid, media tray, document feeder, or access door, and without further user input.

2. The apparatus according to claim 1, said processor causing said graphic user interface to display a menu of options to utilize features of said multifunction printing device after said processor wirelessly pairs said apparatus to said multifunction printing device.

3. The multifunction printing device according to claim 1, said processor wirelessly pairing said apparatus to said multifunction printing device allowing said apparatus to one of print documents, scan documents, and transmit documents over a network.

4. A mobile computerized device comprising:
a processor;
a graphic user interface; and
a wireless network connection operatively connected to said processor,
said wireless network connection discovering multifunction printing devices,
said apparatus being external to said multifunction printing devices,
said graphic user interface displaying a list of said multifunction printing devices and a message for a user to physically move a lid, media tray, document feeder, or access door of one of said multifunction printing devices to identify a selected multifunction printing device of said multifunction printing devices to wirelessly pair said apparatus with,
said selected multifunction printing device detecting said user moving said lid, media tray, document feeder, or access door after said apparatus has displayed said message,
in response to said selected multifunction printing device detecting said user moving said lid, media tray, document feeder, or access door, said selected multifunction printing device automatically identifying a network address of said selected multifunction printing device to said apparatus, without further user input, and said processor wirelessly pairing said apparatus to said selected multifunction printing device through said wireless network connection based on said network address of said selected multifunction printing device, in response only to said user moving said lid, media tray, document feeder, or access door, and without further user input.

5. The mobile computerized device according to claim 4, said processor causing said graphic user interface to display a menu of options to utilize features of said multifunction printing device after said processor wirelessly pairs said apparatus to said selected multifunction printing device.

6. The mobile computerized device according to claim 4, said processor wirelessly pairing said apparatus to said selected multifunction printing device allowing said apparatus to one of print documents, scan documents, and transmit documents over a network.

7. A method of wirelessly pairing a multifunction printing device with an external device when a network address of said multifunction printing device is unknown to said external device, said external device being external to said multifunction printing device, said method comprising:

automatically discovering said multifunction printing device using a wireless network connection of said external device;

automatically causing said external device to display a message for a user to physically move a lid, media tray, document feeder, or access door of said multifunction printing device to wirelessly pair said external device to said multifunction printing device;

detecting said user moving said lid, media tray, document feeder, or access door by said multifunction printing device after said external device has displayed said message;

in response to said detecting said user moving said lid, media tray, document feeder, or access door, said multifunction printing device automatically identifying said network address of said multifunction printing device to said external device, without further user input; and automatically wirelessly pairing said external device to said multifunction printing device through said wireless network connection based on said network address of said multifunction printing device, in response only to said user moving said lid, media tray, document feeder, or access door, and without further user input.

8. The method according to claim 7, further comprising causing said external device to display a menu of options to utilize features of said multifunction printing device after said wirelessly pairing is completed, operating through said wireless network connection.

9. The method according to claim 7, said wirelessly pairing allowing said external device to one of print documents, scan documents, and transmit documents over a network.

10. A method of wirelessly pairing a multifunction printing device with an external mobile computing device, said external mobile computing device being external to said multifunction printing device, said method comprising:

automatically discovering multifunction printing devices using a wireless network connection of said external mobile computing device;

automatically causing said external mobile computing device to display a list of said multifunction printing devices and a message for a user to physically move a lid, media tray, document feeder, or access door of one of said multifunction printing devices to identify a selected multifunction printing device of said multifunction printing devices to wirelessly pair said external mobile computing device with;

detecting said user moving said lid, media tray, document feeder, or access door by said selected multifunction printing device after said external mobile computing device has displayed said message;

in response to said detecting said user moving said lid, media tray, document feeder, or access door, said selected multifunction printing device automatically identifying a network address of said selected multifunction printing device to said external mobile computing device, without further user input; and automatically wirelessly pairing said external mobile computing device to said selected multifunction printing device through said wireless network connection based on said network address of said selected multifunction printing device, in response only to said user moving said lid, media tray, document feeder, or access door, and without further user input.

11. The method according to claim 10, further comprising causing said external mobile computing device to display a menu of options to utilize features of said selected multifunction printing device after said wirelessly pairing is completed, operating through said wireless network connection.

12. The method according to claim 10, said wirelessly pairing allowing said external mobile computing device to one of print documents, scan documents, and transmit documents over a network.

* * * * *